United States Patent [19]

Burdick

[11] 3,855,755

[45] Dec. 24, 1974

[54] ROTATABLE BUILDING STRUCTURE HAVING FLUID BEARINGS

[75] Inventor: Robert E. Burdick, Santa Barbara, Calif.

[73] Assignee: Rolair Systems, Inc., Santa Barbara, Calif.

[22] Filed: Aug. 30, 1973

[21] Appl. No.: 392,974

[52] U.S. Cl. .................................. 52/65, 52/237
[51] Int. Cl. ...................... E04b 1/346, E04b 1/345
[58] Field of Search ................ 52/1, 2, 29, 65, 237; 308/9

[56] References Cited
UNITED STATES PATENTS

| | | | |
|---|---|---|---|
| 1,855,534 | 4/1932 | Williams | 52/65 X |
| 2,700,798 | 2/1955 | Perrottet | 52/237 X |
| 2,964,144 | 12/1960 | Wheeler | 52/65 |
| 3,078,522 | 2/1963 | Anderson | 52/65 X |
| 3,125,189 | 3/1964 | Graham | 52/65 |
| 3,174,809 | 3/1965 | Mackie | 308/9 |
| 3,299,588 | 1/1967 | Arnold | 52/745 X |
| 3,383,810 | 5/1968 | Mola | 52/65 X |
| 3,388,513 | 6/1968 | Bauer | 52/65 |
| 3,395,500 | 8/1968 | Smith | 52/65 X |
| 3,491,496 | 1/1970 | Johnston | 52/65 |
| 3,513,934 | 5/1970 | Crowley | 308/9 X |
| 3,552,807 | 1/1971 | Blount | 308/9 |
| 3,781,069 | 12/1973 | Gluchon | 308/9 X |

FOREIGN PATENTS OR APPLICATIONS

| | | | |
|---|---|---|---|
| 637,510 | 3/1962 | Canada | 52/65 |

Primary Examiner—Ernest R. Purser
Assistant Examiner—Leslie A. Braun
Attorney, Agent, or Firm—Harris, Kern, Wallen & Tinsley

[57] ABSTRACT

A building structure having a central core portion supporting on fluid bearings a rotor portion which is rotatable about the core. The bearings may be aligned in a series of concentric circles or may be grouped in twos and threes in unique bearing sttuctures, allowing the rotor to be supported in a bearing pressurized mode or in an unpressurized mode. The invention includes a lateral bearing system to insure low friction rotation, a truss system positioned between the core and the rotor for spreading the load of the rotor and for providing a spacing to gain access to the bearings for maintenence, and a strut arrangement allowing the bearings to be pivoted for ease of replacement.

5 Claims, 18 Drawing Figures

ROTATABLE BUILDING STRUCTURE HAVING FLUID BEARINGS

BACKGROUND OF THE INVENTION

1. Field of the Invention

The present invention relates to a building structure and more particularly, to a rotatable building structure having fluid bearings positioned in concentric alignment to support a rotor portion of the building structure. The structure is simply constructed, reliable and relatively inexpensive to build and maintain.

2. Description of the Prior Art

Rotating structures are well known in the prior art as exemplified by U.S. Pat. Nos. 3,125,189 and 3,675,378. These structures usually relate to the rotation of a single level or enclosure such as a restaurant, for example. U.S. Pat. No. 3,299,588, exemplifies a building with a multi-level rotational portion. Rotating structures may be used to take advantage of a panoramic picturesque view so that all occupants of the rotatable structure are able to enjoy the entire view every revolution. On the other hand a rotatable structure may be used to enable all occupants to share a view of one particular site. For example, a hotel may be built near a waterfall or in view of a mountain where it would be desirable that all occupants of the hotel have at least a part time view of the particular phenomenon. Otherwise the hotel must be structured so that some occupants have a full time view from their rooms while other occupants are completely without such a view.

It is of course understood that building structures are relatively heavy so that the bearing requirements to move but a single room is substantial while bearing requirements to move a major portion of an entire building are even more considerable. Weight loads are extremely high while lateral loads, such as those due to winds, are uneven and sporadic so that designing such a structure is extremely difficult.

The patents mentioned hereinabove illustrate mechanical bearings for supporting the loads of the buildings to be rotated. As mentioned these loads can be considerable and create many great difficulties. Of course, to be commercially feasible any rotatable structure designed must be relatively inexpensive, have ready access for maintenance, operate at low cost levels, and take into consideration such things as wind loads and climatic conditions and differential thermal expansions, have good reliability and be relatively simply constructed. All of these are factors which must be considered by anyone attempting to develop such a structure.

SUMMARY OF THE INVENTION

The present invention alleviates many of the problems mentioned hereinabove by providing a rotatable building structure comprising in combination a central core portion having a support base mounted in a fixed position; an outer rotor portion mounted about the core portion and supported thereby; a first annular surface on the rotor portion; a second annular surface on the core portion, the first and second surfaces being oppositely positioned; a plurality of fluid bearings positioned in concentric rings connected to one of the annular surfaces and positioned between the surfaces for supporting, when operating, the rotor portion away from the core portion; and means for rotating the rotor portion relative to the core portion. In addition, a lateral bearing system may be provided comprising in combination a plurality of vertically disposed bearings connected to the building; means connected to the building for supplying a fluid to the bearings; means connected to the bearings for directing the fluid away from the bearings; an annular channel connected to the building for receiving the fluid; and drain means for transporting the fluid away from the channel. In addition, the invention includes a unique strut system as will be explained hereinbelow.

It is a general aim of the present invention to provide a rotatable building structure which is simply constructed, reliable and relatively inexpensive.

Another aspect of the present invention is to provide a building structure having a portion which is rotatable upon fluid bearings.

Still another object of the present invention is to provide a building structure having a central core portion around which is a rotatable rotor portion, each portion having corresponding annular surfaces between which are placed fluid bearings to support the rotor portion and allow it to rotate.

Another aim of the present invention is to provide a building structure having a bearing system for laterally supporting the rotatable portion of the structure.

Yet another aspect of the present invention is to provide a rotatable building structure having unique support struts. The struts allowing easy bearing replacement and maintenance. A truss structure may also be provided having access to the bearings.

Other objects and advantages of the invention will appear from the following descriptions taken in conjunction with accompanying drawings.

DESCRIPTION OF THE PREFERRED EMBODIMENTS

While the present invention is susceptible of various modifications and alternative constructions, illustrative embodiments are shown in the drawings and will herein be described in detail. It should be understood however that it is not the intention to limit the invention to the particular forms disclosed; but on the contrary the intention is to cover all modifications, equivalences and alternative constructions falling within the spirit and scope of the invention as expressed in the appended claims.

Figure 1:
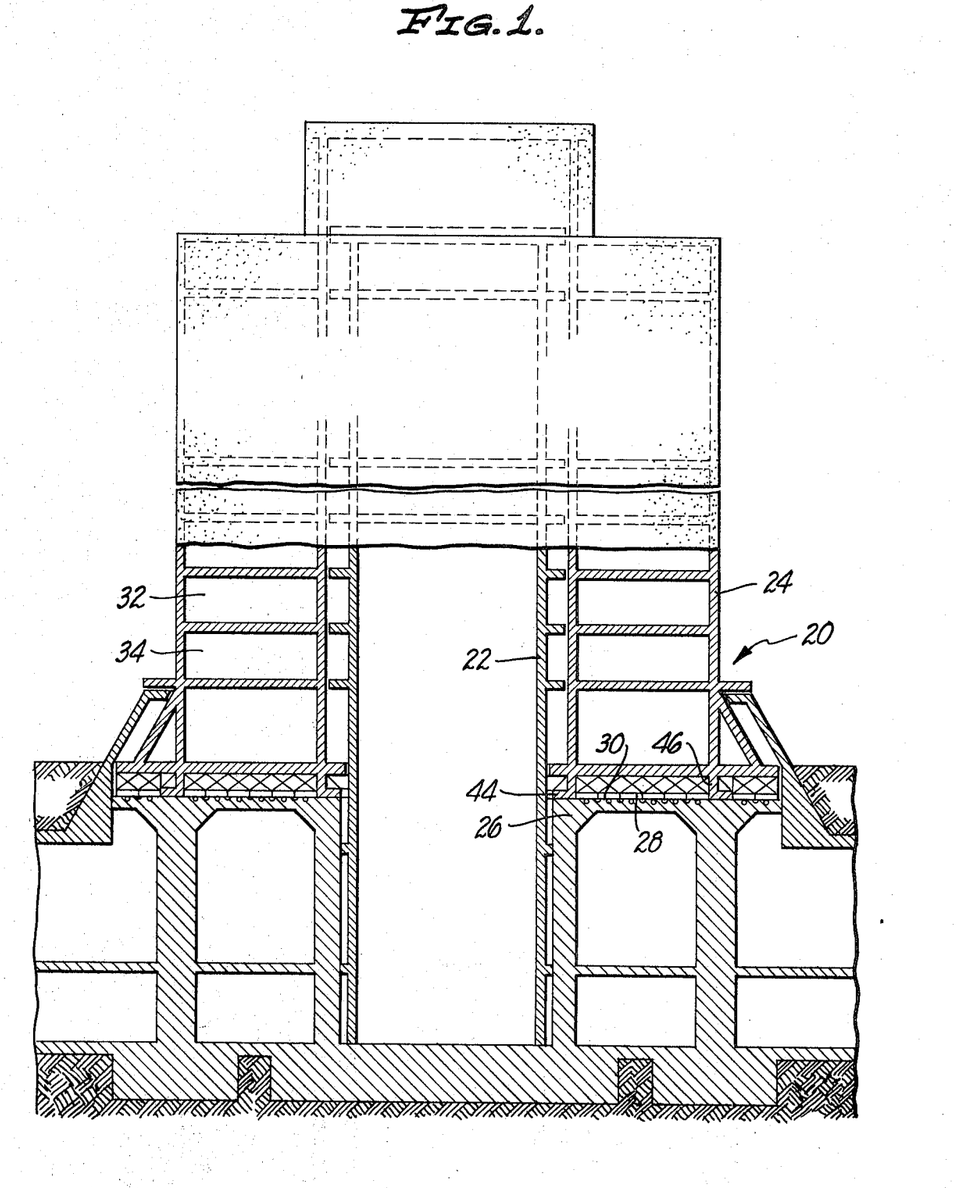
FIG. 1 is an elevational view illustrating a building structure partially in skeletal form having a central core portion and a rotatable rotor portion.

Referring now to FIG. 1 there is illustrated a building structure 20 which is comprised of a central core portion 22 about which is a rotor portion 24. The central core 22 has a support base 26 and is constructed in a traditional fashion so as to be firmly fixed in the ground. As will be explained in more detail hereinbelow the rotor includes an annular surface 28 which is oppositely positioned from another annular surface 30, a part of the central core support base 26. As can be appreciated from the drawing the building structure is designed so that the rotor is rotatable about the central core to expose each of the rotor compartments, such as compartments 32 and 34, to a 360° panoramic view of the surroundings. As mentioned the building structure 20 may be a hotel so that the compartments 32, 34 are hotel rooms. A revolving hotel may be very advantageous in a region where the surroundings are sufficiently beautiful. The only way all of the hotel guest can view the surroundings without undue inconvenience is to have a rotatable structure. On the other hand if there is one particular site that is unique, such as a waterfall then a rotatable structure allows all of the hotels guests to share a view, rather than structure the building to have preferential rooms on a first side and nonpreferential rooms on an opposite side.

Figures 2, 3:
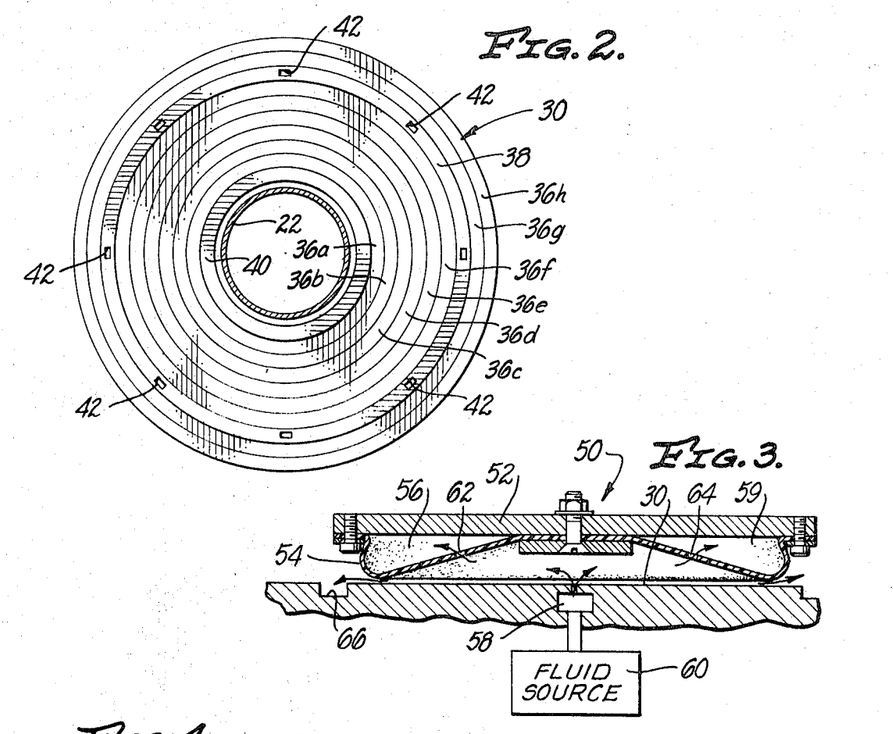
FIG. 2 is a plan view of a support base of the central core portion.
FIG. 3 is a diagrammatic elevational view illustrating the operation of a fluid bearing.

Turning now to FIG. 2 there is illustrated one variation of the annular surface 30 divided into eight concentric rings 36a, 36b, 36c, 36d, 36e, 36f, 36g, and 36h. Positioned between the concentric rings 36f and 36g is an outer rotor base 38 while positioned between concentric ring 36a and the central core portion 22 is an inner rotor base 40. The concentric indicate the location of eight groupings of fluid bearings, such as bearings described hereinbelow in relation to FIG. 3. The fluid bearings are placed about in concentric circles to support the rotor portion and allow its rotation. By way of example only, for a rotor portion load of 25,000,000 pounds the concentric circles may contain the following number of bearings in the concentric rings 36a through 36h respectively: 27, 31, 35, 39, 44, 48, 56, 60. Spaced equally around the outer rotor base 38 are eight openings 42 to receive rotor drive systems such as that shown in FIG. 12 and explained hereinbelow in more detail. The rotor bases coincide with the annular support columns 44 and 46, FIG. 1, of the rotor 24. In this way should it be desired to either remove the bearings or place the bearings in a no-load disposition (i.e., without pressure) the annular columns 44, 46 would rest directly upon the rotor bases and thereby transmit the vertical loads of the rotor to the fixed central core.

Referring now to FIG. 3 there is illustrated in diagrammatic form a fluid bearing 50. The bearing is comprised of an upper metal plate 52 to which is attached a compliant member 54 of suitable flexible material. The compliant material, which is drawn out of scale for purposes of illustration, is attached at its center to the metal plate so as to form in elevational view two chamber portions 56 and 59. The bearing is shown in its operative condition slightly above a smooth surface such as the annular surface 30 of the core of the building structure. Beneath the bearing in the annular surface 30 is a fluid supply opening 58 being in communication with a fluid supply source 60. The fluid used may be high pressure air or a liquid such as water.

As depicted by a series of arrows the fluid is pumped through the opening 58 and through small openings 62 and 64 in the compliant material 54 to allow fluid entry into the chamber portions 56 and 59 respectively. Some of the fluid passes between the compliant material and the surface 30 and is dissipated. In the case of air, the dissipation is to the environment; in the case of a liquid, a drain opening 66 is provided to carry the spent liquid away from the bearing and is disposed of or the liquid is carried back to the fluid source for re-pumping. In this fashion a sufficient pressure is developed which allows the bearing to lift a short distance above the surface 30 and support a load. As can now be appreciated, placing some 300 bearings in concentric alignment about the surface 30 as suggested by example in relation to the FIG. 2 embodiment would allow support of a substantial load.

Figure 4:
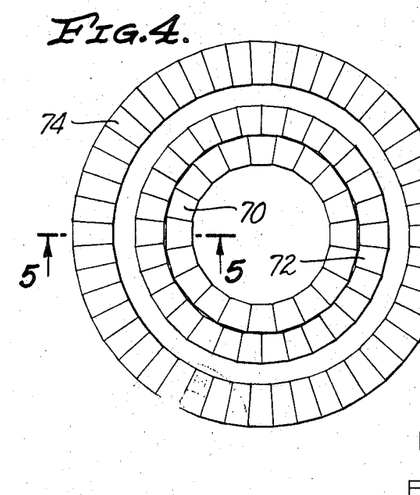
FIG. 4 is a variation plan view similar to that shown in FIG. 2 illustrating the placement of fluid bearings to support the rotor portion of the building structure.

An important aspect of the present invention is to provide a rotatable building structure which is simply constructed, reliable and relatively inexpensive. The specification in relation to FIG. 2 describes one variation to achieve these advantages; FIG. 4 illustrates another variation. The selection of one variation as opposed to another is dependant upon the load distribution of the rotating structure and base. Rather than having eight concentric rings of air bearings and two rotor bases the embodiment shown in FIG. 4 illustrates three concentric rings of specially designed bearing structures (see FIGS. 6 and 7). An inner concentric ring 70 of the bearings is adjacent a middle concentric ring 72 which in turn is enclosed by an outer concentric ring 74. In this configuration the inner concentric ring 70 includes a number of bearing structures each having a somewhat tapered shape and each including two fluid bearings. The same is true of the bearing structures comprising the middle concentric ring. The outer concentric ring also includes tapered bearing structures where each includes three bearings per structure. By way of comparative example to the embodiment of FIG. 2, the inner concentric ring includes 20 bearing structures. The middle concentric ring has 30 bearing structures and the outer concentric rings includes 48 bearing structures at a center line diameter of 92 feet.

Figure 5:
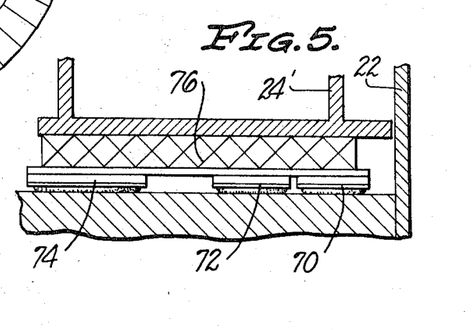
FIG. 5 is an enlarged diagrammatic elevational view taken along line 5—5 of FIG. 4.

Referring now to FIG. 5 there is illustrated in diagrammatic form a truss structure 76 between the concentric bearing rings 70, 72, and 74 and the supported rotor portion 24' of the building structure. The truss structure serves two functions, first to spread the load of the rotor portion, and second, to provide a low weight structure which also allows access room to service the bearings. In the example structure referred to above (FIG. 4 embodiment) the suitable vertical height of the truss is five and one-half feet.

Figures 6, 6A, 7:
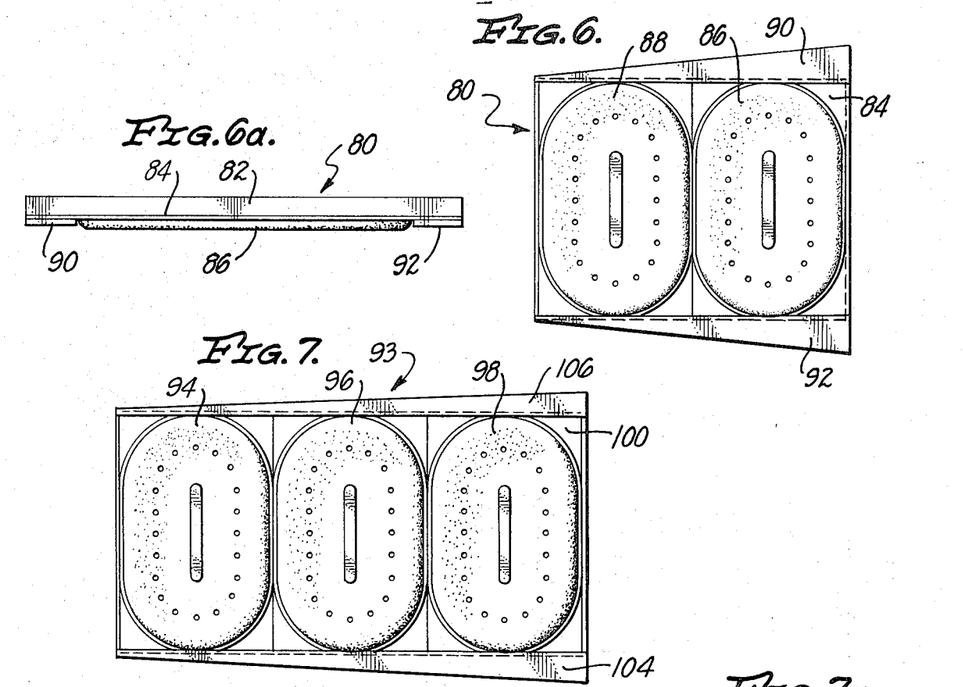
FIG. 6 is a plan view of a dual bearing structure illustrating the placement of two fluid bearings side by side.
FIG. 6a is an enlarged elevational view of the dual bearing structure of FIG. 6.
FIG. 7 is a plan view of a tri-bearing structure in which three bearings are placed side by side.

Referring to FIGS. 6 and 6a each bearing structure includes a tapered support block 82 to which is attached a metal bearing plate 84 which in turn is removably connected to two compliant members 86 and 88. Additionally, each structure includes two triangular support sections 90 and 92. When the bearings are operative there will be a slight spacing between the compliant members 86 and 88 and the surface above which the bearing structure is positioned (as well as between the triangular support and the surface). However, when the bearings are in an inoperative condition then the compliant members 86 and 88 compress and the load carried by a bearing is supported through the triangular sections 90 and 92.

Figure 7A:
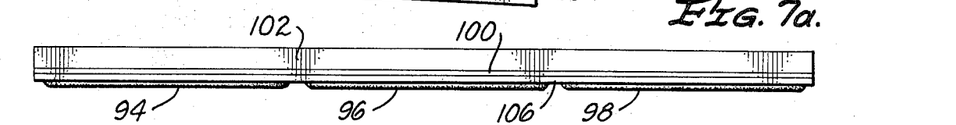
FIG. 7a is an enlarged elevational view of the tri-bearing structure of FIG. 7.

The bearing structures comprising the outer concentric ring 74, FIG. 4, is illustrated in detail in FIGS. 7 and 7a. This latter mentioned structure 93 is constructed like the bearing of FIGS. 6 and 6a except that three compliant members 94, 96 and 98 are removably attached to a bearing plate 100 which in turn is connected to a support block 102. Once again the support block is somewhat tapered so as to form two triangular support sections 104 and 106 which support the rotor position of the building structure when the bearings are in their lowered inoperative (unpressurized) condition.

It is to be noted that the embodiment of FIG. 4 does not include rotor bases like the embodiment of FIG. 2. This is achieved because the load of the rotor is not transferred from the bearings to the rotor bases when the bearings go from their operative to inoperative conditions as happens with the FIG. 2 embodiment. Rather, the load is transferred from the compliant members to the triangular support sections in the FIG. 4 embodiment. In this regard, the truss structure, FIG. 5, is used to more evenly distribute the load among all of the bearing structures.

Figure 8:
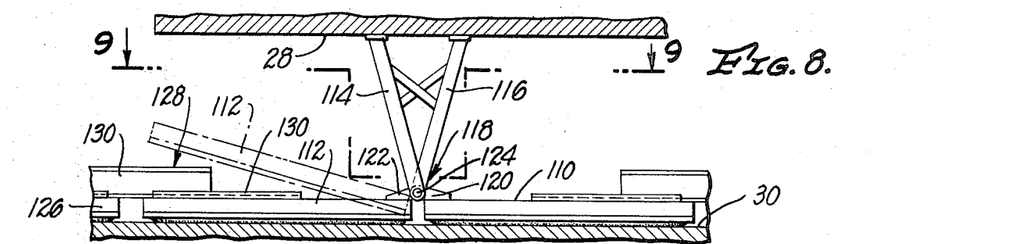
FIG. 8 is an elevational view of a strut and pivotal bearing structure positioned between the core and rotor portions of a building structure.
Figure 9:
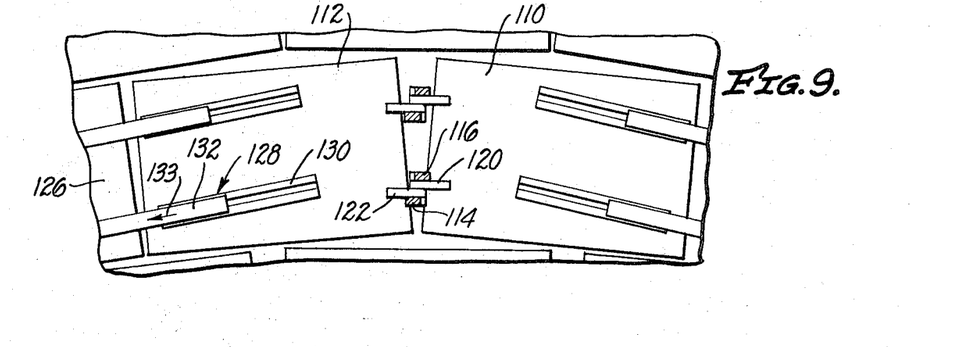
FIG. 9 is a plan view taken along line 9—9 of FIG. 8.

FIGS. 8 and 9 exemplify the simplicity of the present invention by illustrating a support system allowing bearing structures to be maintained and replaced with ease. In a preferred embodiment the support system would be used with the FIG. 2 embodiment though the concept may also be applied to the truss system of FIG. 5. Two bearing structures 110 and 112 are connected to a pair of strut members 114 and 116 by a hinge 118. The hinge includes two lateral arms 120, 122 which are attached to the bearing structures 110, 112, respectively, and to the strut members through a hinge pin 124. The hinge pin also connects the lower ends of the pair of strut members; the upper diverging ends of the strut members are attached to the rotor's annular surface 28.

The hinge arrangement allows the bearing structures to pivot from a relatively horizontal position as shown in solid line to an oblique position as shown in phantom line providing a way to remove and replace the bearing plate and compliant member. This facilitates maintenance of the bearing structures without unduly hampering the rotational ability of the building structure. As can be appreciated by viewing FIGS. 6 and 7 the bearing plate and compliant members are easily removable, since the plate slides relative to the support block.

To help spread the load among the various bearings each bearing structure is connected to an adjacent bearing structure either by way of the hinge 118 or by a fastener 128. The fastener 128 is comprised of a channel shaped track 130 which is welded to the top of the support block and a rail 132 which is slidable along the track 130 as well as a corresponding track (not shown) on the bearing structure 126. When the rail is in the position shown in FIG. 9 the bearing structures are retained in their horizontal position. To allow a bearing structure to be pivoted upwardly the rail 132 is moved to the left (as depicted by the arrow 133) to disengage the track 130. The bearing structure 112 can then be pivoted upwardly to allow access to the bearing for on site maintenance or for removal and replacement.

Figures 10, 11, 12:
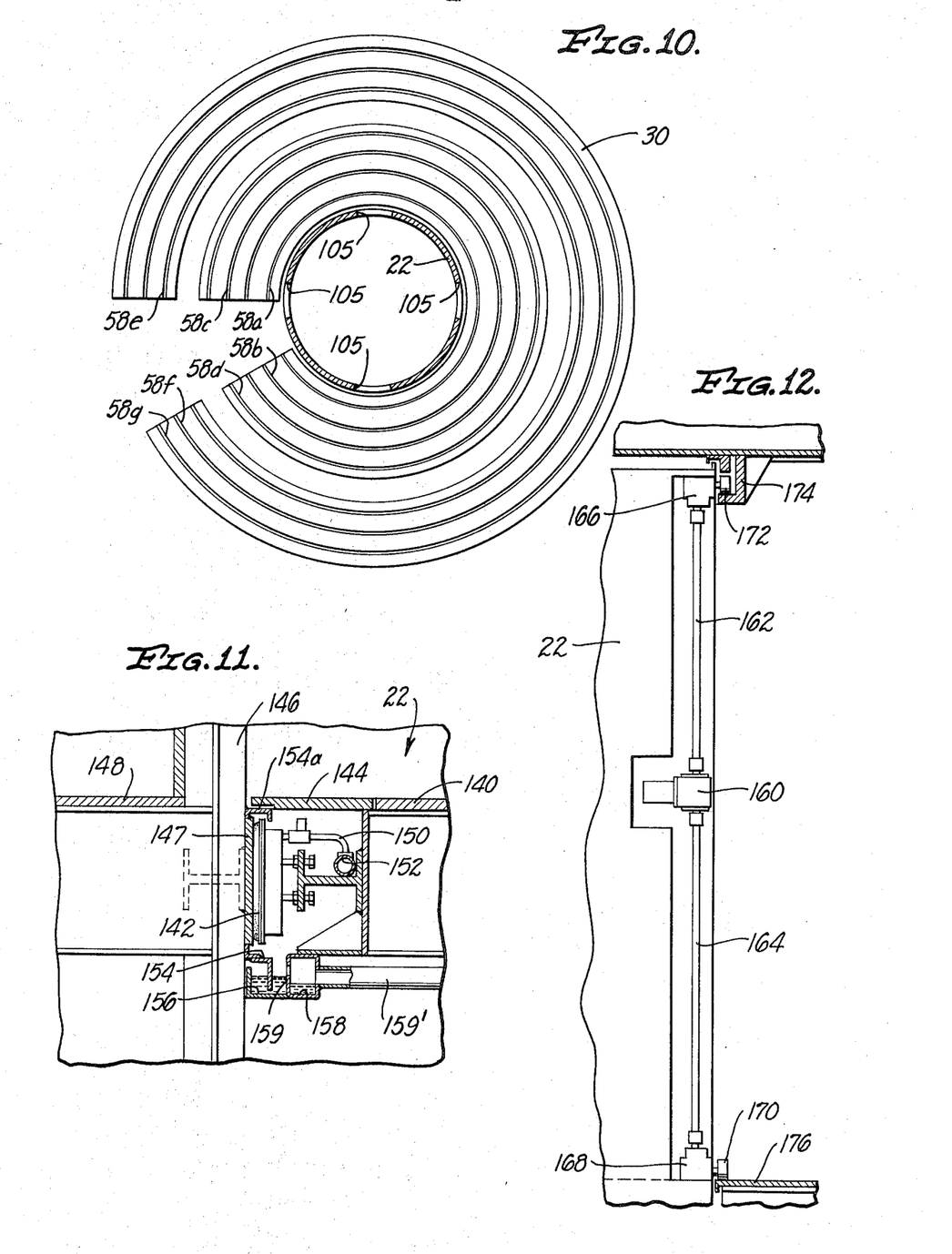
FIG. 10 is a variation plan view similar to that shown in FIG. 2 illustrating fluid distribution rings.
FIG. 11 is a sectional elevational view illustrating a lateral fluid bearing system.
FIG. 12 is a sectional elevational view illustrating a rotor drive system.

Referring now to FIG. 10 there is illustrated the annular fluid supply openings 58a through 58g situated in a concentric manner to provide fluid to a bearing arrangement like that illustrated in FIG. 4. Recalling the fluid supply opening 58, FIG. 3, the configuration of the bearing structures 80, 93 and the concentric rings 70, 72 and 74, FIG. 4, it is apparent that the supply openings 58a, 58b service the bearings in the inner concentric ring 70, supply openings 58c, 58d service the bearings in the middle concentric ring 72 and supply openings 58e, 58f, 58g service the bearings in the outer concentric ring 74. Drain openings, like opening 66, FIG. 3, may also be provided. Access openings 105 are spaced equally about the core 22 to allow entry to the truss structure and the bearings.

Another major advantage of the present invention is the provision of lateral support for the rotor. Reference is made to FIG. 11 which illustrates a fluid bearing positioned generally vertically (that is, positioned perpendicular to the bearings heretofore described). More particularly, FIG. 11 illustrates a bearing 142 verticall aligned beneath a floor 140 of the core 22. An access door 144 is also provided to allow servicing of the bearing. The bearing is placed a short distance away from a rotor wall 146 having a bearing pressure plate 147. A rotor floor 148 is at the same level as the core floor 140. A fluid supply conduit 150 connects the bearing and a fluid supply header 152 which in turn communicates with a fluid source (not shown). A particularly unique advantage is achieved when water or some equally fire retardant fluid is used as the bearing fluid. This is achieved by draining the bearing fluid through an annular drain 154 into an annular trough 156. The drain also acts as a seal 154a for the access door to keep the bearing compartment clean. A second annular trough 158 is provided with slightly lower walls so that the water in the trough 156 automatically spills into the trough 158 over a shorten annular wall 159 once the trough 156 is filled above the level of the wall 159. From the trough 158 the water flows through a drain pipe 159 to the liquid source if the system is closed or to a waste outlet. By placing a set of bearings and thereby an annular water filled trough at every floor level of the core structure fire blocks are provided in that no air passage is available. This conforms to municipal code requirements and is a substantial safety feature.

As mentioned in relation to FIG. 2, openings 42 are provided for rotor drive systems. Referring now to FIG. 12 each drive system includes a gear motor 160 which is attached to the core 22. The gear motor is connected to an upwardly extending shaft 162 and a downwardly extending shaft 164. Each of the shafts in turn operatively connects to a set of right angle gears each set being located within a corresponding gear box 166, 168. In turn, the gears are connected to pneumatic drive wheels 170 and 172 which engage portions of the rotor, such as the rotor floor 176 and an annular flange 174 depending from the rotor roof, respectively. By way of example, eight rotor drive systems should be sufficient to rotate a rotor having a diameter of 125 feet at a rotational velocity of one revolution per hour. Of course, the drive wheels may be driven electrically or hydraulically. A variation system could have the drive unit on the rotor and a gear rack mounted to the core. Another variation system could include a drive unit mounted on the core or rotor with a spring or fluid cylinder providing a loading on the driving wheel to bias it toward the rotor or core respectively.

Figure 13:
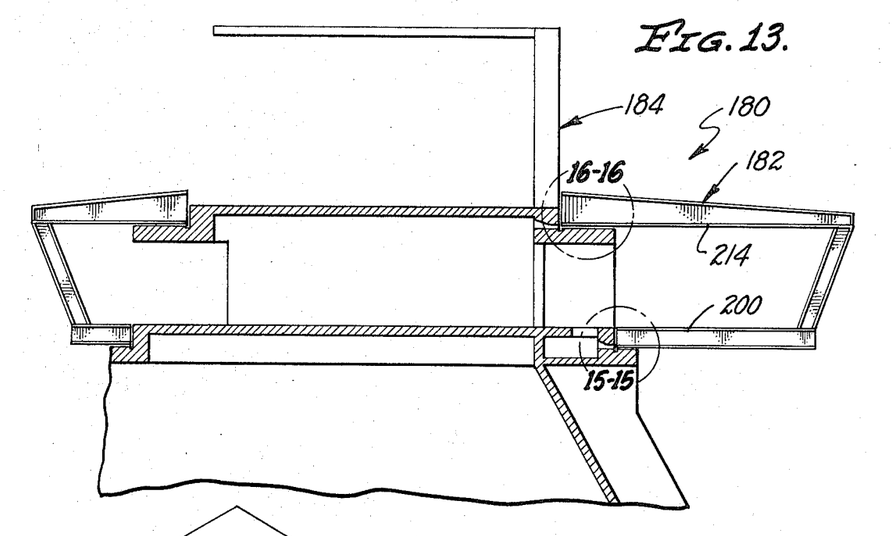
FIG. 13 is a sectional elevational view illustrating a portion of another embodiment of a rotatable building structure.
Figure 14:
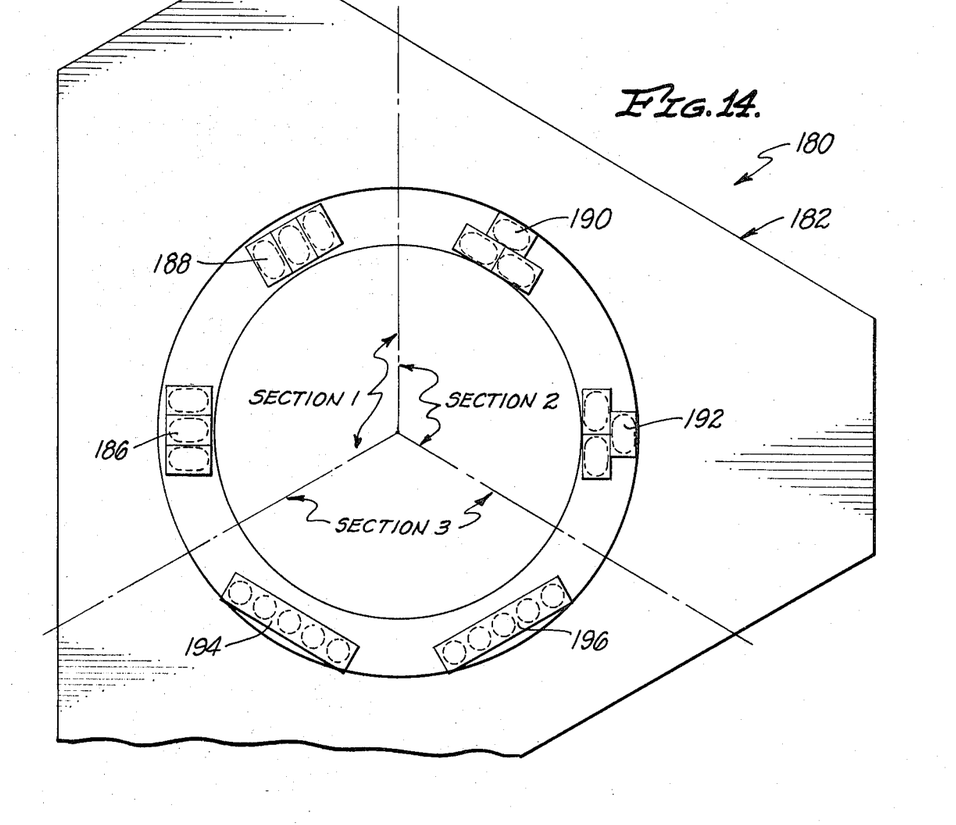
FIG. 14 is a plan view of the structure shown in FIG. 13, divided into three sections.

A variation of the rotatable building structure shown in FIG. 1 is illustrated in FIGS. 13 and 14. In FIG. 1 an entire building structure having a multi-level rotatable portion is illustrated while in FIGS. 13 and 14 only a single level is rotated, such as a restaurant at or near the top of the structure. Nevertheless, the techniques which have been described may on a somewhat reduced scale be used for the rotation of a single level rotor. More particularly, a building structure 180, FIG. 13, is illustrated having a rotor portion 182 with a slightly distorted triangular plan view as best seen in FIG. 14. This rotor revolves about a core 184. The rotor illustrated is divided into three sections each of which shows a different variation of the supporting fluid bearings. In the section marked "Section 1" there are two groups 186, 188 each having three bearings linearly positioned. In the second section "Section 2" there are two groups 190, 192 each having three bearings positioned in a triangular pattern. In the third section "Section 3" two groups 194, 196 are illustrated in which a linear series of smaller circular shaped bearings are used to provide support. Of course, the invention is not restricted to any one of the three groupings but is intended to include any one of the three groupings and in addition any variation or modification thereof.

Figure 15:
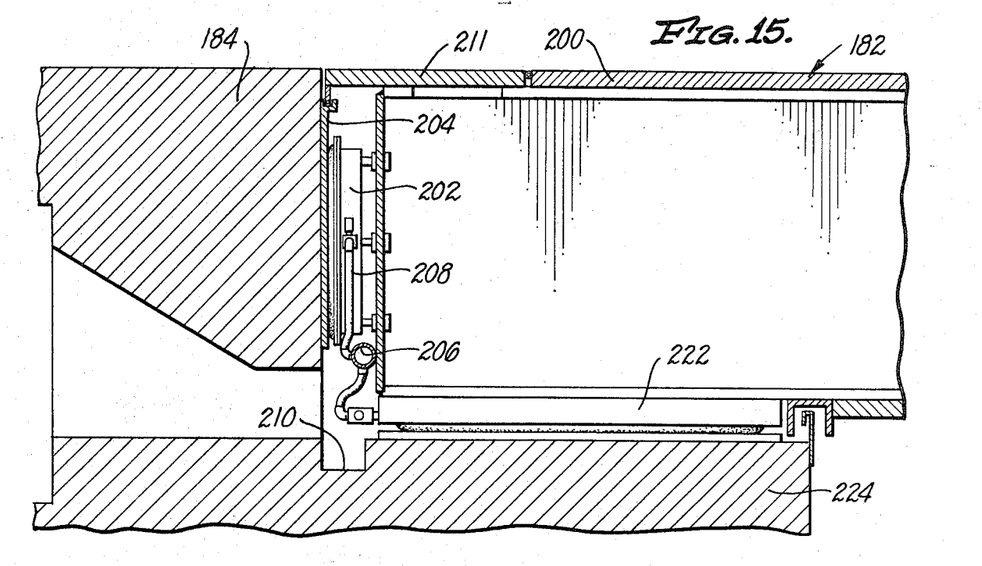
FIG. 15 is a sectional elevational view of a lateral bearing system taken within the circle 15—15 of FIG. 13.

Lateral bearings are provided for lateral support of the rotor 182. One set of bearings exemplified by the bearing 202, FIG. 15, is located adjacent the floor 200 of the rotor portion. The lateral bearing is attached to the rotor 182 and bears against a vertically situated annular runway 204 of the core 184. As with the lateral bearing system of FIG. 11, the FIG. 15 embodiment includes a fluid supply header 206 which is connected to the bearing through a conduit 208. Also provided is an annular drain 210 to collect liquid should it be the desired working fluid. An access door 211 is provided to gain entry around the bearing 202.

Figure 16:
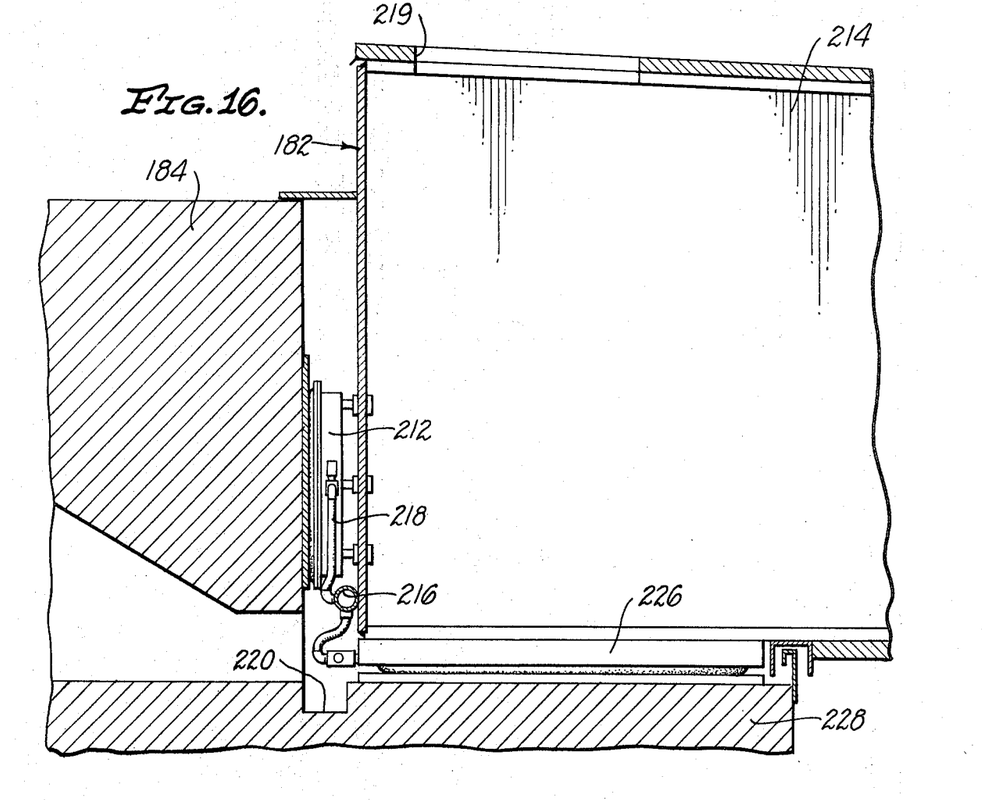
FIG. 16 is a sectional elevational view of a lateral bearing system taken within the circle 16—16 of FIG. 13.

FIG. 16 illustrates an analogous lateral bearing 212 which is adjacent a ceiling 214 of the rotor 182. Once again a fluid supply header 216 is provided which supplies fluid through a conduit 218 to the bearing. Above the bearing is an access door 219. A drain 220 is also provided. Horizontally disposed fluid bearings are located in the region marked 222, FIG. 15, between the rotor and a core base 224, and in the region marked 226, FIG. 16, between the rotor 182 and a core roof 228.

In operation, sufficient bearing pressure is created to allow the rotor to be lifted upwardly from the core support base and spaced laterally about the core so as to allow proper low friction rotation. It can be readily understood that fluid bearings are relatively low friction devices and yet allow lifting of substantial loads. By way of example only, the bearing structures illustrated in FIGS. 6 and 7 were designed to subject each fluid bearing to approximately 113,000 pounds. This requires the fluid pressure to be approximately 50 pounds per square inch. In a fluid-off mode the triangular support sections of the bearing would be subjected to loads ranging from approximately 120 to 1,250 pounds per square inch. In comparison the fluid pressure for the FIG. 7 bearing configuration would be somewhat reduced, though the fluid-off load would be somewhat increased. If a water system is used in the configuration shown in FIG. 4 it is estimated that approximately 4,000 gallons per minute would be needed. (A given combination of total load, bearing size and surface texture dictates the total amount of fluid required; generally regardless of the number of bearings.)

What has been described is a unique, yet simple and relatively inexpensive way in which a large portion of a building structure may be rotated easily and reliably. Because of the truss structure the bearings can be easily maintained or replaced. The lateral bearings include a built-in fire block which is often required as a safety feature in urban construction.

I claim:

1. A building structure having a rotatable portion comprising in combination:
   a central core portion having a support base mounted in a fixed position;
   an outer rotor portion mounted about said core and supported thereby;
   a first horizontally disposed annular surface on said rotor portion;
   a second horizontally disposed annular surface on said core portion, said first and said second surfaces being oppositely positioned one another;
   a plurality of fluid bearings positioned in concentric rings connected to one of said annular surfaces and positioned between said surfaces for supporting, when operative, said rotor portion away from said core;
   means for rotating said rotor portion relative to said core portion;
   additional fluid bearings vertically positioned between said central core portion and said outer rotor portion to laterally support said outer rotor portion;
   a strut structure having upwardly extending legs, connected to said rotor portion said legs joined at their lower ends to a hinge member and said hinge member attached to a bearing plate; and wherein
   said rotating means comprises a drive wheel and a power source operatively connected thereto and connected to said core and rotor portions.

2. A building structure as claimed in claim 1 wherein said second annular surface on said core includes a plurality of concentric runways spaced one from another for conducting fluid to said bearing.

3. A strut system for a building structure having a rotatable portion comprising in combination:
a plurality of fluid bearings spaced between the rotatable portion and a nonrotatable portion of said building structure;
a plurality of pairs of upwardly extending legs, the uppermost ends of each pair being connected to said rotatable portion and the lowermost ends being joined; and
a hinge connected to each pair of legs at said lowermost ends and being connected to a pair of said fluid bearings wherein said bearings are pivotable from a first operative position to a second position to allow replacement.

4. A strut system as claimed in claim 3 including a track connected to each of said fluid bearings; and
a retention means slidably mounted within tracks of adjoining bearings for selectively retaining said fluid bearings in their first position.

5. A building structure having a rotatable portion comprising in combination:
a central core portion having a support base mounted in a fixed position;
an outer rotor portion mounted about said core and supported thereby;
a first annular surface on said rotor portion;
a second annular surface on said core portion, said first and second surfaces being oppositely positioned one another;
a plurality of fluid bearings positioned in concentric rings connected to one of said annular surfaces and positioned between said surfaces for supporting, when operative, said rotor portion away from said core;
means for rotating said rotor portion relative to said core portion; and
a strut structure connected to said rotor portion, said structure including a pair of legs being joined at their lower ends to a hinge member, with said hinge member attached to a bearing plate.

* * * * *